(12) United States Patent
Glaser

(10) Patent No.: US 7,453,360 B2
(45) Date of Patent: Nov. 18, 2008

(54) IDENTIFICATION-DATA MEDIA

(75) Inventor: Rupert Glaser, Hörlkofen (DE)

(73) Assignee: Infineon Technologies AG, Munich (DE)

( * ) Notice: Subject to any disclaimer, the term of this patent is extended or adjusted under 35 U.S.C. 154(b) by 168 days.

(21) Appl. No.: 11/182,657

(22) Filed: Jul. 15, 2005

(65) Prior Publication Data

US 2006/0027666 A1 Feb. 9, 2006

(30) Foreign Application Priority Data

Jul. 19, 2004 (DE) .......................... 10 2004 034 768

(51) Int. Cl.
G08B 13/14 (2006.01)

(52) U.S. Cl. .............. 340/572.1; 340/572.7; 340/572.8; 235/439; 361/734; 343/850

(58) Field of Classification Search ... 340/572.1–572.8; 343/850, 857; 235/492, 451, 435, 439; 361/734, 361/738, 760, 763
See application file for complete search history.

(56) References Cited

U.S. PATENT DOCUMENTS

| 4,567,473 | A | 1/1986 | Lichtblau | 340/572.3 |
|---|---|---|---|---|
| 4,822,390 | A | 4/1989 | Kazumoto et al. | 62/6 |
| 6,181,287 | B1 * | 1/2001 | Beigel | 343/741 |
| 6,404,644 | B1 * | 6/2002 | Ikefuji et al. | 361/737 |
| 6,686,650 | B1 * | 2/2004 | Gogami et al. | 257/666 |
| 6,719,206 | B1 * | 4/2004 | Bashan et al. | 235/492 |
| 6,762,683 | B1 * | 7/2004 | Giesler | 340/572.8 |
| 6,853,087 | B2 * | 2/2005 | Neuhaus et al. | 257/778 |
| 6,991,172 | B2 * | 1/2006 | Luu | 235/492 |
| 7,158,033 | B2 * | 1/2007 | Forster | 340/572.1 |
| 2004/0219714 | A1 * | 11/2004 | Yagi et al. | 438/106 |

FOREIGN PATENT DOCUMENTS

| DE | 3840180 | 4/1990 |
|---|---|---|
| DE | 10108080 | 4/2002 |
| DE | 10109221 | 9/2002 |

* cited by examiner

Primary Examiner—Toan N Pham
(74) Attorney, Agent, or Firm—Dicke, Billig & Czaja, PLLC

(57) ABSTRACT

An identification carrier is disclosed. In one embodiment, the identification data carrier, includes a carrier substrate, having an electronic chip fitted on and/or in the carrier substrate, and having a transmitting/receiving antenna formed on and/or in the carrier substrate and serving for transmitting and for receiving electromagnetic radiation, and having a first capacitance, the chip being capacitively coupled to the transmitting/receiving antenna by means of the first capacitance.

19 Claims, 3 Drawing Sheets

IDENTIFICATION-DATA MEDIA

FIELD OF THE INVENTION

The invention relates to an identification data carrier.

CROSS-REFERENCE TO RELATED APPLICATIONS

This Utility Patent Application claims priority to German Patent Application No. DE 10 2004 034 768.9-53, filed on Jul. 14, 2004, which is incorporated herein by reference.

BACKGROUND

Identification marks for identifying persons or articles are used in many areas of daily life. Identification marks based on bar codes are used in accordance with the prior art, but they are personnel-intensive and thus expensive in application since they have to be read using an optical reader that has to be operated by a user. Moreover, bar code systems cannot be used practically in many areas of application of identification marks (for example empty-theft systems in department stores).

"Radio Frequency Identification Tags" (RFID tags) are suitable for such applications. An RFID tag usually contains an antenna, a circuit for receiving and transmitting electromagnetic waves (transponder) and a signal processing circuit. Consequently, such an RFID tag is often constructed from a small silicon chip connected to an antenna applied on a plastic carrier.

An RFID tag enables data to be read or stored contactlessly. Such data are stored on RFID tags (clearly electronic labels). The stored data are read by means of electromagnetic waves that can be coupled into the RFID tag via the antenna.

Areas of use for an RFID tag include electronic merchandise protection systems for preventing theft, applications in automation technology (for example the automatic identification of vehicles in traffic in the context of toll systems), access control systems, cashless payment, ski passes, fuel cards, animal identification and applications in lending libraries.

RFID tags are often applied on a thin film, for example made of polyethylene terephthalate (PET). In order to supply the RFID tag with power and in order to couple out the data, an antenna is used and printed onto the film.

Connecting both ends of the antenna or coil to the chip requires two plated-through holes on the film.

Such an RFID tag 100 in accordance with the prior art is described below referring to FIG. 1.

FIG. 1 illustrates an RFID tag 100, the circuitry-active components of which are formed on a PET film 101. An electronic chip 102 is arranged on a first main surface 110, the two chin connections of the electronic chip being coupled to two antenna connections of an antenna 103. The antenna 103 is formed by printing a spiral aluminum structure onto the first main surface 110. Furthermore, a first plated-through hole 104 and a second plated-through hole 105 are formed in the PET film 101, and are filled with electrically conductive material in order to resistively couple one of the chip connections to one of the antenna connections using a rear-side contact-making element 106.

The fitting of the plated-through holes 104, 105 causes a considerable proportion of all the assembly costs in the case of the RFID tag 100 in accordance with the prior art.

For these and other reasons, there is a need for the present invention.

The present invention provides an identification data carrier. In one embodiment the identification data carrier of the invention contains a carrier substrate, an electronic chip fitted on and/or in the carrier substrate, a transmitting/receiving antenna formed on and/or in the carrier substrate and serving for transmitting and for receiving electromagnetic radiation, and a first capacitance, the chip being capacitively coupled to the transmitting/receiving antenna by means of the first capacitance.

A basic idea of the invention can be seen in the fact that, in the case of an identification data carrier (for example an RFID tag), an electronic chip is coupled capacitively to a transmitting/receiving antenna, rather than being coupled resistively as in accordance with the prior art. On account of the realization of a capacitive coupling by means of the first capacitance, that is to say by means of a capacitor, the provision of cost-intensive plated-through holes becomes dispensable.

The components of the first capacitance, the chip and the transmitting/receiving antenna may be formed on one main surface or on both main surfaces of a carrier substrate of the identification data carrier according to the invention, it being possible for the plated-through passages to be obviated on account of the dispensability of a resistive coupling. As a result, the identification data carrier of the invention can be manufactured considerably more favorably. The term main surfaces denotes the two areas of the carrier substrate which form by far the predominant proportion of the surface area of the preferably filmlike, planar carrier substrate.

By way of example, two electrically conductive structures may be formed as capacitor plates of the first capacitance on different surface regions of one main surface of the carrier substrate or alternatively on opposite main surfaces of the carrier substrate. With the use of a radiofrequency exciting electromagnetic radiation that can be absorbed by the transmitting/receiving antenna, the capacitive coupling element has a sufficiently low impedance, so that it clearly approximately forms a short circuit.

In other words, the invention avoids the need to provide plated-through passages in the case of an RFID tag film by means of the provision of at least one capacitor. Consequently, instead of conventional plated-through holes, capacitors are constructed in accordance with the invention in order to couple an electronic chip to a transmitting/receiving antenna in the case of an identification data carrier.

If a capacitor is constructed instead of such plated-through holes, then a series resonant circuit comprising the first capacitor (or comprising two or more capacitors) and a coil results. If the series resonant frequency of this circuit is far less than the parallel resonant frequency, the resonant circuit acts substantially inductively and the capacitors are then to be regarded virtually as a short circuit.

If the carrier substrate, which may be realized as a film, is very thin (for example 30 μm) and has a sufficiently large value of the relative permittivity (for example $\epsilon_r = 4$), even relatively large capacitances can be produced very easily. If the capacitance is nevertheless too small for a specific application, then the capacitance can be increased by means of insipiently etching the film in a region in which two capacitor elements of the first capacitance lie opposite one another and are separated by the insipiently etched film. The capacitance may also be additionally increased by means of using a particularly thin film or a film material having a value of the relative permittivity $\epsilon_r$ that is sufficiently high.

The solution according to the invention is particularly of interest precisely at increasing frequencies (in the radiofrequency range and above). The higher the RFID operating frequency, the smaller the capacitor can be chosen to be and the less additional area is required.

In one embodiment, the electronic chip, the transmitting/receiving antenna and the first capacitance may be formed on the same main surface of the carrier substrate. In this case, the production costs are reduced to a particularly great extent since only a single side of the carrier substrate has to be processed.

In accordance with the embodiment just described, the first capacitance may have a first electrically conductive structure and a second electrically conductive structure arranged at a distance from the first electrically conductive structure, the first electrically conductive structure being coupled to a first chip connection of the chip, the second electrically conductive structure being coupled to a first antenna connection of the transmitting/receiving antenna, and a second chip connection of the chip being coupled to a second antenna connection of the transmitting/receiving antenna. In accordance with this refinement, a coupling is created between chip, transmitting/receiving antenna and the first capacitance, which are all formed on a common main surface of the carrier substrate, as a result of which the processing costs are reduced to a particularly great extent.

The identification data carrier may have a second capacitance, the chip being capacitively coupled to the transmitting/receiving antenna by means of the first capacitance and by means of the second capacitance.

In accordance with this embodiment, the electronic chip may be formed on a first main surface of the carrier substrate, and the transmitting/receiving antenna may be formed on a second main surface of the carrier substrate, said second main surface lying opposite the first main surface.

In this embodiment, a coupling between the electronic chip and the transmitting/receiving antenna on the two different main surfaces of the carrier substrate is effected by means of a capacitive coupling element, one part of which is provided on the first main surface and another part of which is provided on the second main surface. In this way, the components (area A) of the capacitor are separated from one another by the carrier substrate and are thus provided at a distance d from one another, so that, in accordance with the equation $$C = \epsilon_0 \epsilon_r A/d \tag{1}$$

a particularly high value of the capacitance C of the capacitor and thus a good capacitive coupling can be achieved. This is because, in accordance with this refinement, the material of the carrier substrate can be chosen in such a way that the value of the relative permittivity $\epsilon_r$ is particularly high. Moreover, the distance between the capacitor elements, that is to say the thickness d of the carrier substrate, can be chosen to be small enough to achieve a sufficiently large capacitance. The areas A of the capacitor elements can be chosen to be large enough to set the value of C as desired. The value of the electric field constant is $\epsilon_0 = 8.85 \cdot 10^{-12}$ F/m.

In the case of the identification data carrier, the first capacitance may have a first electrically conductive structure formed on the first main surface and a second electrically conductive structure arranged on the second main surface at a distance from the first electrically conductive structure, the second capacitance having a third conductive structure formed on the first main surface and a fourth conductive structure arranged on the second main surface at a distance from the third electrically conductive structure, the first electrically conductive structure being coupled to a first chip connection of the chip, the third electrically conductive structure being coupled to a second chip connection of the chip, the second electrically conductive structure being coupled to a first antenna connection of the transmitting/receiving antenna, and the fourth electrically conductive structure being coupled to a second antenna connection of the transmitting/receiving antenna.

In this embodiment, a particularly good capacitive coupling is achieved using two capacitances provided on opposite main surfaces of the carrier substrate.

The transmitting/receiving antenna may be formed as a planar spiral structure. Cost-effective processing is accordingly possible since such a transmitting/receiving antenna can be printed onto the carrier substrate in a simple manner.

At least one of the electrically conductive structures may be formed as an interrupted ring structure, that is to say as an essentially ringlike structure that is separated in a ring section. A ring is understood to be a circular ring, a rectangular ring, etc.

The carrier substrate may be a plastic film, in particular a PET film (polyethylene terephthalate).

The carrier substrate may be free of a passage hole. The processing costs can be considerably reduced by means of saving passage holes.

The electronic chip may be a silicon chip. To put it another way, the electronic chip may be formed as an integrated circuit using silicon technology, so that it is possible to have recourse to the mature standard processes of silicon microtechnology.

The identification data carrier may be set up as an RFID tag ("Radio Frequency Identification Tag").

Different components of the first capacitance may be separated by the carrier substrate, and the carrier substrate may have a smaller thickness in a region in which said components are formed than in other regions. To put it another way, the carrier substrate may be thinned in a region in which the components are formed. By means of thinning the carrier substrate in a region in which capacitor elements are formed on two opposite main surfaces of the carrier substrate, it is possible, in accordance with equation (1), by means of reducing the thickness d, to greatly increase the capacitance and thus to improve the capacitive coupling.

SUMMARY

An identification data carrier, having a carrier substrate; having an electronic chip fitted on and/or in the carrier substrate; having a transmitting/receiving antenna formed on and/or in the carrier substrate and serving for transmitting and for receiving electromagnetic radiation; having a first capacitance, the chip being capacitively coupled to the transmitting/receiving antenna by means of the first capacitance.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts

Identical or similar components in different figures are provided with the same reference numerals.

The illustrations in the figures are schematic and not to scale.

DETAILED DESCRIPTION

In the following Detailed Description, reference is made to the accompanying drawings, which form a part hereof, and in which is illustrated by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
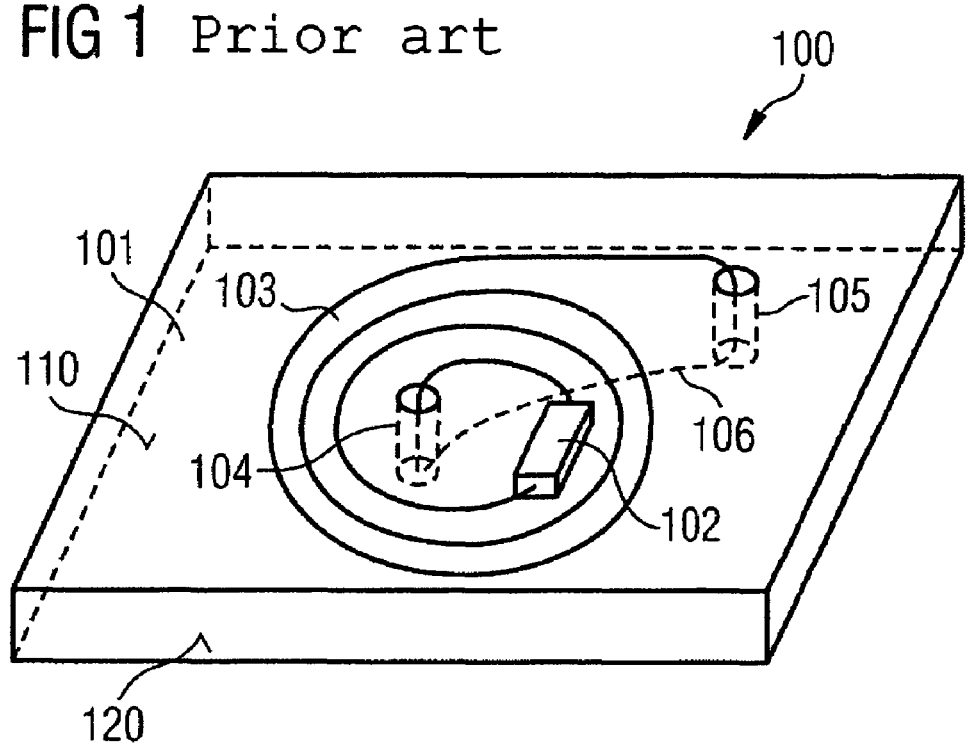
FIG. 1 illustrates an RFID tag in accordance with the prior art.
Figure 2:
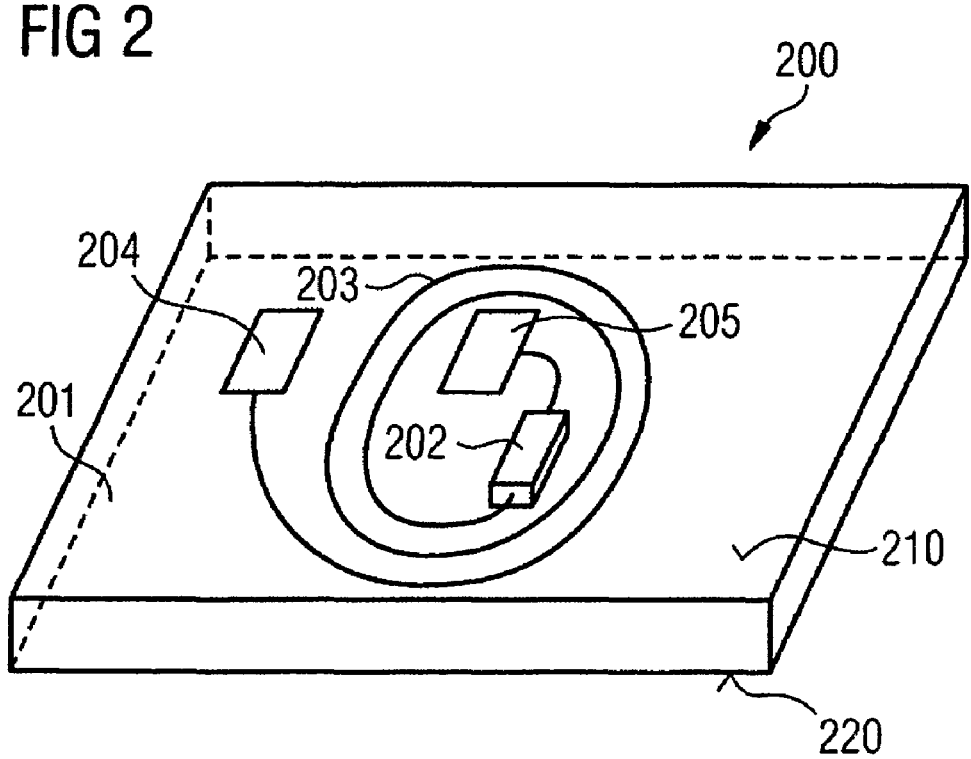
FIG. 2 illustrates an RFID tag in accordance with a first exemplary embodiment of the invention.

A description is given below, referring to FIG. 2, of an RFID tag 200 in accordance with a first exemplary embodiment of the invention.

The RFID tag 200 as an identification data carrier according to the invention contains a PET film 201 as carrier substrate, an electronic chip 202 applied on a first main surface 210 of the PET film 201, and a transmitting/receiving antenna 203 formed on the first main surface 210 and serving for transmitting and receiving electromagnetic radiation. Furthermore, the RFID tag 200 contains a first capacitor element 204 in a first surface region of the first main surface 210 and a second capacitor element 205 in a second surface region of the first main surface 210. The second main surface 220, which is formed in a manner lying opposite the first main surface 210, is free of processing, as a result of which the assembly costs are significantly reduced.

The first capacitor element 204 is coupled to a first connection of the transmitting/receiving antenna 203, the second connection of which is coupled to a first connection of the electronic chip 202. A second connection of the electronic chip is coupled to the second capacitor element 205.

In an operating mode of the RFID tag 200, a reader (not shown), for reading out information contained in the RFID tag 200, emits electromagnetic radiation that can be absorbed by the coil 203. This electromagnetic radiation lies for example in the radiofrequency range (for example at 13.56 MHz). This electromagnetic radiation is coupled into the integrated circuit in the electronic chip 202. This requires a coupling of the transmitting/receiving antenna 203 to the electronic chip 202. This coupling is realized capacitively according to the invention, that is to say by virtue of the fact that the first capacitor element 204 and the second capacitor element 205 form a capacitor and, at a high frequency ω of an electromagnetic radiation, having a sufficiently small proportion $Z_c$ of the impedance ($Z_c=1/C\omega$). In this scenario, the capacitor element 204, 205 essentially represents a short circuit.

The integrated circuit of the electronic chip 202 contains a voltage supply unit, which rectifies an AC voltage between the connections of the transmitting/receiving antenna 203 in order to form a DC voltage. Such a DC voltage serves for supplying the integrated circuit of the electronic chip 202 with electrical DC voltage energy. Said DC voltage that is generated by the voltage supply from an electromagnetic radiation that has been received by the transmitting/receiving antenna 203 may be provided to an RF clock generator and a control unit (with a memory unit) for power supply purposes. The memory unit, which contains stored information of the RFID tag 200, and the control unit form a signal that can be emitted in the form of electromagnetic waves by the transmitting/receiving antenna 203. An output signal of the control unit is thus emitted by means of the transmitting/receiving antenna 203, and can be received and decoded by the reader, so that data stored in the RFID tag 200 can be identified by the reader.

Figure 3:
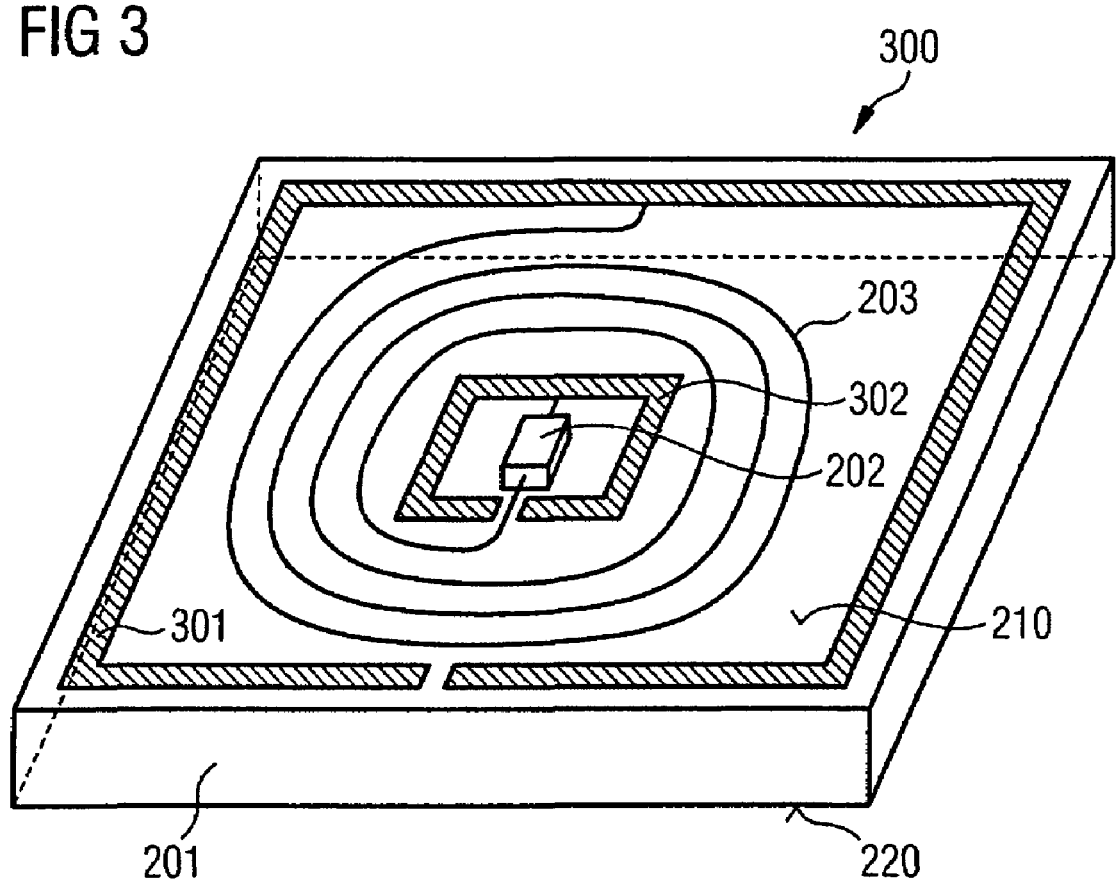
FIG. 3 illustrates an RFID tag in accordance with a second exemplary embodiment of the invention.

A description is given below, referring to FIG. 3, of an RFID tag 300 in accordance with a second exemplary embodiment of the invention.

The RFID tag 300 differs from the RFID tag 200 essentially by virtue of the fact that the geometry of the first and second capacitor elements 204, 205 differs from the geometry of a first capacitor element 301 and a second capacitor element 302. The first capacitor element 301 and the second capacitor element 302 are in each case embodied as a rectangular interrupted ring structure.

Figure 4A:
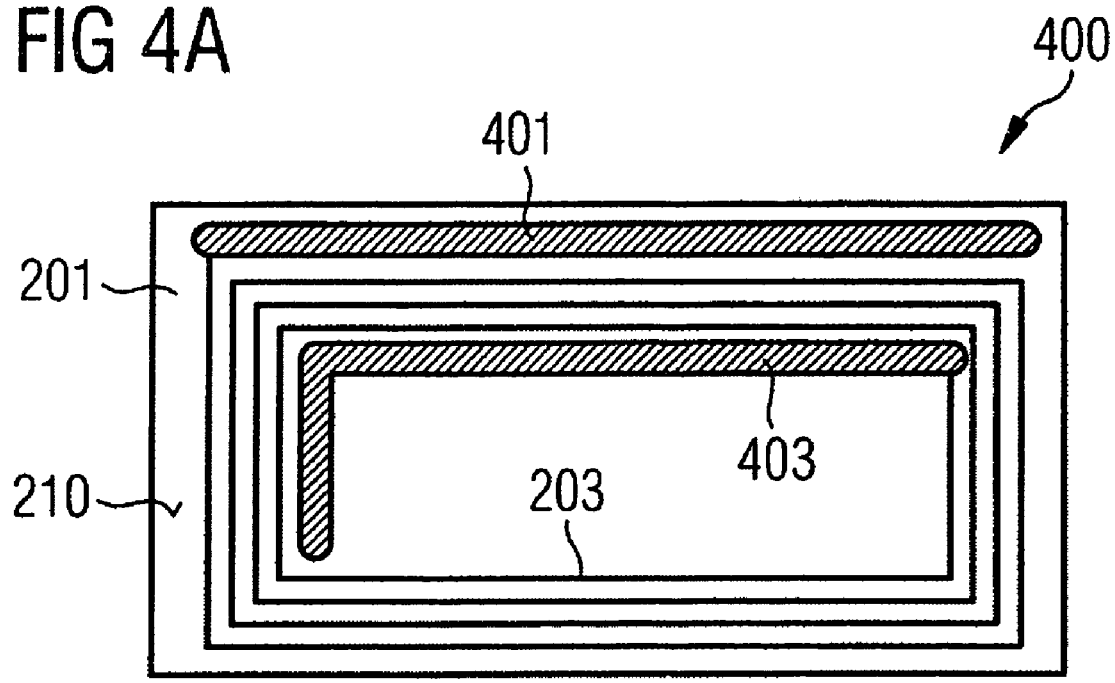
FIG. 4A illustrates a first main surface of a carrier substrate of an RFID tag in accordance with a third exemplary embodiment of the invention.

A description is given below, referring to FIG. 4A, FIG. 4B, of an RFID tag 400 in accordance with a third exemplary embodiment of the invention.

Figure 4B:
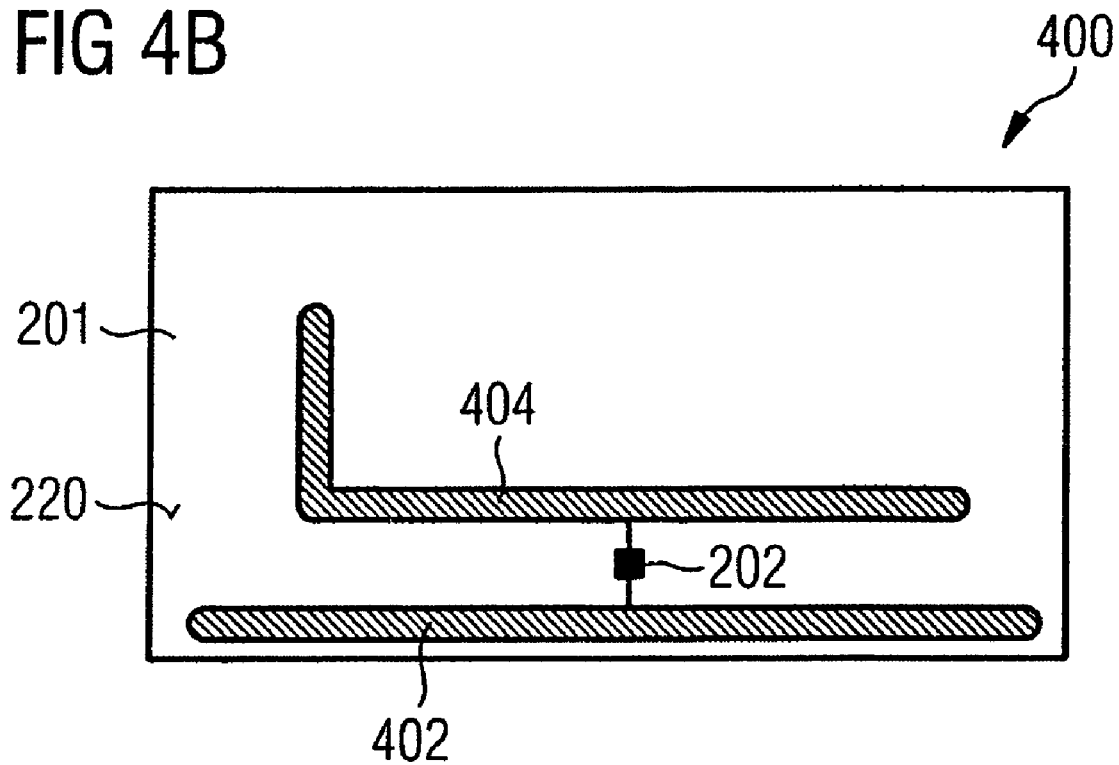
FIG. 4B illustrates a second main surface of a carrier substrate of the RFID tag in accordance with the third exemplary embodiment of the invention.

The RFID tag 400 is an exemplary embodiment of the invention in which components of the RFID tag 400 are formed on both main surfaces of the PET film 201, namely one part being formed on a first main surface 210 (see FIG. 4A) and another part being formed on the second main surface 220 (see FIG. 4B). In other words, FIG. 4A shows a first main surface 210 of the RFID tag 400 (that is to say the RFID tag 400 from a front side), whereas FIG. 4B shows the RFID tag 400 from a rear side (that is to say a plan view of the second main surface 220).

Two capacitors are provided in accordance with this configuration. A first capacitor is formed from a first capacitor element 401 on the first main surface 210, and from a geometrically identically formed second capacitor element 402 on the second main surface 220. To put it another way, the first capacitor element 401 and the second capacitor element 402 are separated only by the PET film 201.

Furthermore, an L-shaped third capacitor element 403 is shown, which is formed on the first main surface 210 of the PET film 201. In a corresponding geometrical configuration, a fourth capacitor element 404 is formed (likewise L-shaped) on the second main surface 220 of the RFID tag 400 and, together with the third capacitor element 403, forms the second capacitor.

The first capacitor element 401 is coupled to a first coil connection of the transmitting/receiving coil 203. A second connection of the transmitting/receiving coil 203 is coupled to the third capacitor element 403. A first chip connection of the electronic chip 202 is coupled to the second capacitor element 402, and a second chip connection of the electronic chip 202 is coupled to the fourth capacitor element 404.

By means of the two capacitors, a capacitive coupling is produced between the electronic chip 202 and the transmitting/receiving antenna 203, so that a good electrical coupling of antenna 203 and chip 202 is realized precisely at high frequencies in the case of the RFID tag 400, in a manner mediated by the two capacitors 401, 402 and 403, 404.

Although specific embodiments have been illustrated and described herein, it will be appreciated by those of ordinary skill in the art that a variety of alternate and/or equivalent implementations may be substituted for the specific embodiments illustrated and described without departing from the scope of the present invention. This application is intended to cover any adaptations or variations of the specific embodiments discussed herein. Therefore, it is intended that this invention be limited only by the claims and the equivalents thereof.

The invention claimed is:

1. An identification data carrier comprising:
a carrier substrate;
at least one capacitor at the carrier substrate;
an antenna positioned at the carrier substrate; and
a chip capacitively coupled to the antenna with the at least one capacitor for transmitting and receiving identification signals between the chip and the antenna,
wherein the carrier substrate has a major or surface, and the antenna the at least one capacitor, and the chip are formed at the major surface.

2. The identification data carrier of claim 1, comprising: wherein the signals are electromagnetic radiation signals.

3. The identification data carrier of claim 1, comprising wherein the carrier substrate is made of plastic.

4. The identification data carrier of claim 1, comprising wherein the carrier substrate is made of polyethylene terephthalate.

5. The identification data carrier of claim 1, comprising wherein the identification data carrier is configured as a radio frequency identification tag.

6. An identification data carrier, comprising:
a carrier substrate having a main surface;
an electronic chip fitted on the carrier substrate;
a transmitting/receiving antenna formed on the carrier substrate and configured for transmitting and receiving electromagnetic radiation; and
a first capacitance, the chip being capacitively coupled to the transmitting/receiving antenna via the first capacitance,
wherein the electronic chip, the transmitting/receiving antenna, and the first capacitance are formed on the mark surface of the carrier substrate.

7. The identification data carrier of claim 6, comprising: wherein the first capacitance has a first electrically conductive structure and a second electrically conductive structure arranged at a distance from the first electrically conductive structure, the first electrically conductive structure being coupled to a first chip connection of the chip, the second electrically conductive structure being coupled to a first antenna connection of the transmitting/receiving antenna, and a second chip connection of the chip being coupled to a second antenna connection of the transmitting/receiving antenna.

8. The identification data carrier of claim 7, comprising wherein the at least one of the electrically conductive structures is formed as an interrupted ring structure.

9. The identification data carrier of claim 8, comprising wherein the ring structure has a rectangular shape.

10. The identification data carrier of claim 6, comprising wherein the transmitting/receiving antenna is formed as a planar spiral structure.

11. The identification data carrier of claim 6, comprising wherein the carrier substrate is a plastic film.

12. The identification data carrier of claim 6, comprising wherein the carrier substrate is free of a passage hole.

13. The identification data carrier of claim 6, wherein the electronic chip is a silicon chip.

14. The identification data carrier of claim 6, configured as an RFID tag.

15. The identification data carrier of claim 6, comprising wherein different components of the first capacitance are spaced apart on the main surface of the carrier substrate, and wherein the carrier substrate has a smaller thickness in a region in which the components are formed than in other regions of the carrier substrate.

16. An identification data carrier comprising:
a carrier substrate;
a capacitive coupling including at least two capacitors;
an antenna positioned at the carrier substrate;
a chip coupled with the capacitive coupling to the antenna for transmitting and receiving identification signals between the chip and the antenna;
wherein the electronic chip, the transmitting/receiving antenna and the capacitive coupling are formed on a first main surface of the carrier substrate.

17. The identification data carrier of claim 16, comprising wherein the first capacitance has a first electrically conductive structure formed on the main surface and a second electrically conductive structure arranged on the main surface at a distance from the first electrically conductive structure, the second capacitance has a third electrically conductive structure formed on the main surface and a fourth electrically conductive structure arranged on the main surface at a distance from the third electrically conductive structure, the first electrically conductive structure being coupled to a first chip connection of the chip, the third electrically conductive structure being coupled to a second chip connection of the chip, the second electrically conductive structure being coupled to a first antenna connection of the transmitting/receiving antenna, and the fourth electrically conductive structure being coupled to a second antenna connection of the transmitting/receiving antenna.

18. An identification data carrier comprising:
means for providing a carrier substrate;
means for providing an antenna, positioned at the means for providing a carrier substrate;
a chip; and
means for capacitively transmitting identification signals between the chip and the antenna,
wherein the chip, the means for capacitively transmitting, and the means for providing an antenna are formed on a main surface of the carrier substrate.

19. A radio frequency identification tag comprising:
a carrier substrate made of plastic;
an electronic identification chip; and
an antenna positioned at the carrier substrate, capacitively coupled to the electronic identification chip and configured to transmit identification signals between the electronic identification chip and a reader,
wherein the electronic identification chip and the antenna are formed on the main surface of the carrier substrate, and the electronic identification chip is capacitively coupled to the antenna on the main surface of the carrier substrate.

* * * * *